United States Patent [19]

Schofield

[11] Patent Number: 4,825,726

[45] Date of Patent: May 2, 1989

[54] DIFFERENTIAL GEAR ARRANGEMENT

[75] Inventor: Clifford R. Schofield, Studham, England

[73] Assignee: Lucas Industries Public Limited Company, England

[21] Appl. No.: 94,547

[22] Filed: Sep. 9, 1987

[30] Foreign Application Priority Data

Sep. 27, 1986 [GB] United Kingdom ............... 8623279

[51] Int. Cl.⁴ .................... F16H 1/28; F16H 47/04; F16H 3/44; F16H 57/10
[52] U.S. Cl. ...................................... 74/801; 74/687; 74/750 R; 74/793
[58] Field of Search ............... 74/750 R, 793, 801, 74/687

[56] References Cited

U.S. PATENT DOCUMENTS

| | | | |
|---|---|---|---|
| 1,882,033 | 10/1932 | Pirinoli | 74/801 X |
| 2,667,089 | 1/1954 | Gregory | 74/793 X |
| 2,795,155 | 6/1957 | Bade | 74/805 |
| 4,278,928 | 7/1981 | Griffiths et al. | 74/687 |

FOREIGN PATENT DOCUMENTS 0143667 5/1961 U.S.S.R. ........................ 74/750 R

OTHER PUBLICATIONS

Nicholas P. Chironis, Mechanisms, Linkages and Mechanical Control, 1965, pp. 248–255.

Primary Examiner—Leslie A. Braun
Assistant Examiner—Harold F. Macris
Attorney, Agent, or Firm—Andrus, Sceales, Starke & Sawall

[57] ABSTRACT

A differential gear arrangement has an annular planet gear having internal and external teeth which mesh with a sun gear and a ring gear respectively. The planet gear is supported in a carrier which is journalled in a housing and is also journalled internally and externally of the ring gear. The arrangement permits use of rolling-bearing journals throughout.

6 Claims, 3 Drawing Sheets

DIFFERENTIAL GEAR ARRANGEMENT

This invention relates to a differential gear arrangement particularly for use in a constant speed drive system for an electric generator.

It is known, for example from U.S. Pat. No. 4,278,928, to provide an electric generator arrangement in which an alternator is driven by an input shaft by way of differential epicyclic gearing. The gearing has a second input whose speed can be varied to maintain a constant speed of the alternator over a wide range of speeds of the input shaft.

An electric generator arrangement of the foregoing kind is principally intended for use in 400 Hz aircraft electric power systems, with consequent requirement for minimum volume and weight. The relatively small size has the effect that if conventional epicyclic gearing is used the planet pinions must be mounted on a carrier by means of plain bearings which require constant lubrication. The required small size and weight of the arrangement imposes difficulties in providing a constant supply of lubricant. The alternator typically has a two-pole rotor, whereby the differential gearing must have an output speed of 24,000 r.p.m. to effect the 400 Hz alternator output. At such speeds the use of plain bearings having an intermittent supply of lubricant is unsatisfactory.

It is an object of the present invention to provide a differential gear arrangement which overcomes the foregoing problems by having rotating elements of sufficiently large diameters as to be journalled in, or on, rolling bearings, without increasing the overall size of the gear arrangement. The present invention obtains this result by providing a single annular planet gear having external teeth meshing with a ring gear and internal teeth meshing with a sun gear, the planet gear being journalled on a carrier which is in turn journalled on the ring gear.

An embodiment of the invention will now be described by way of example only and with reference to the accompanying drawings in which.

Figure 1:
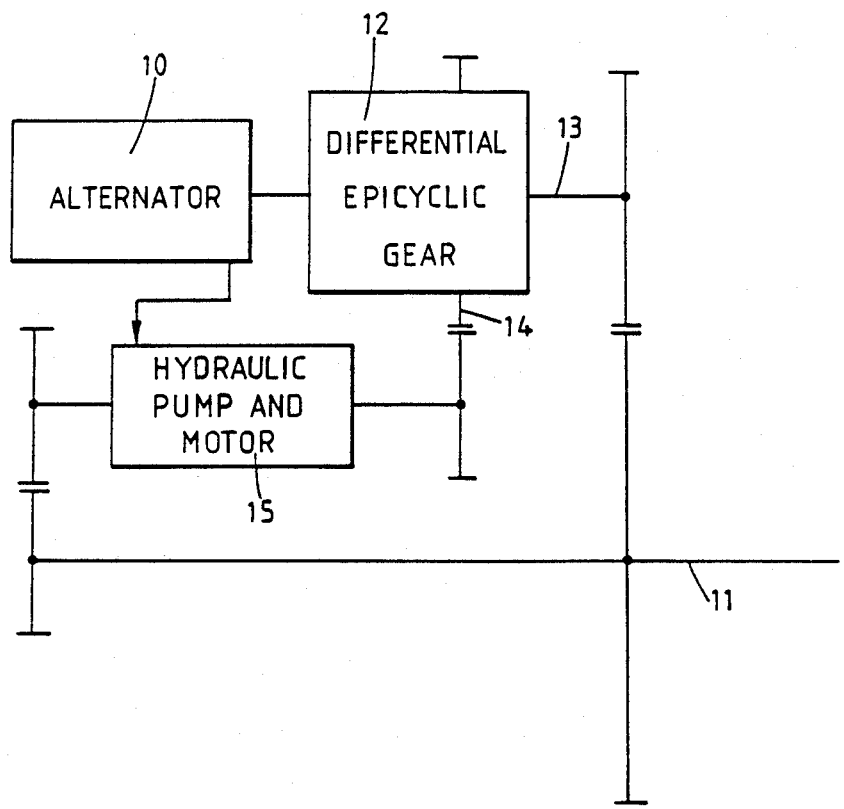
FIG. 1 is a diagram of an electric generator arrangement.
Figure 2:
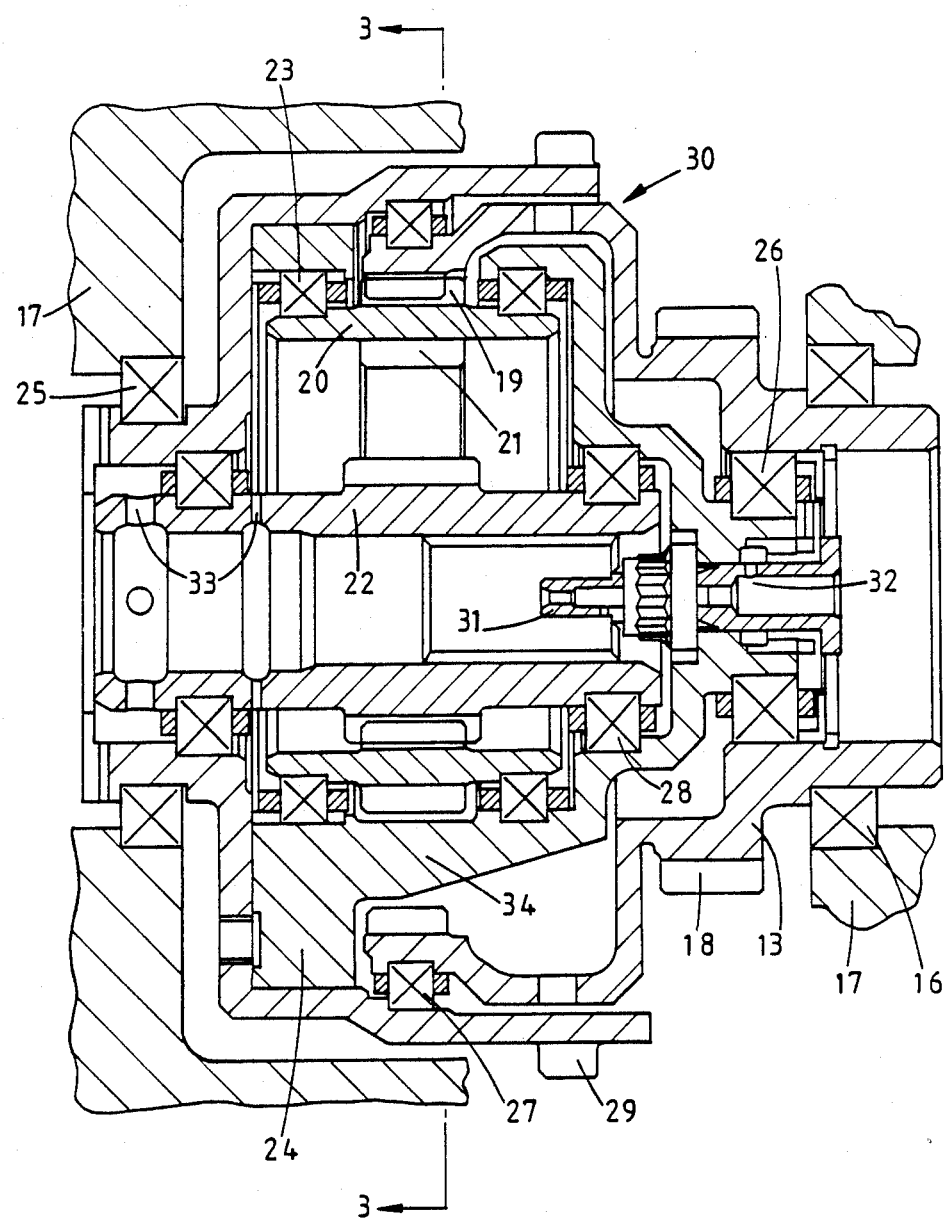
FIG. 2 is a section through epicyclic gearing forming part of the arrangement of FIG. 1.
Figure 3:
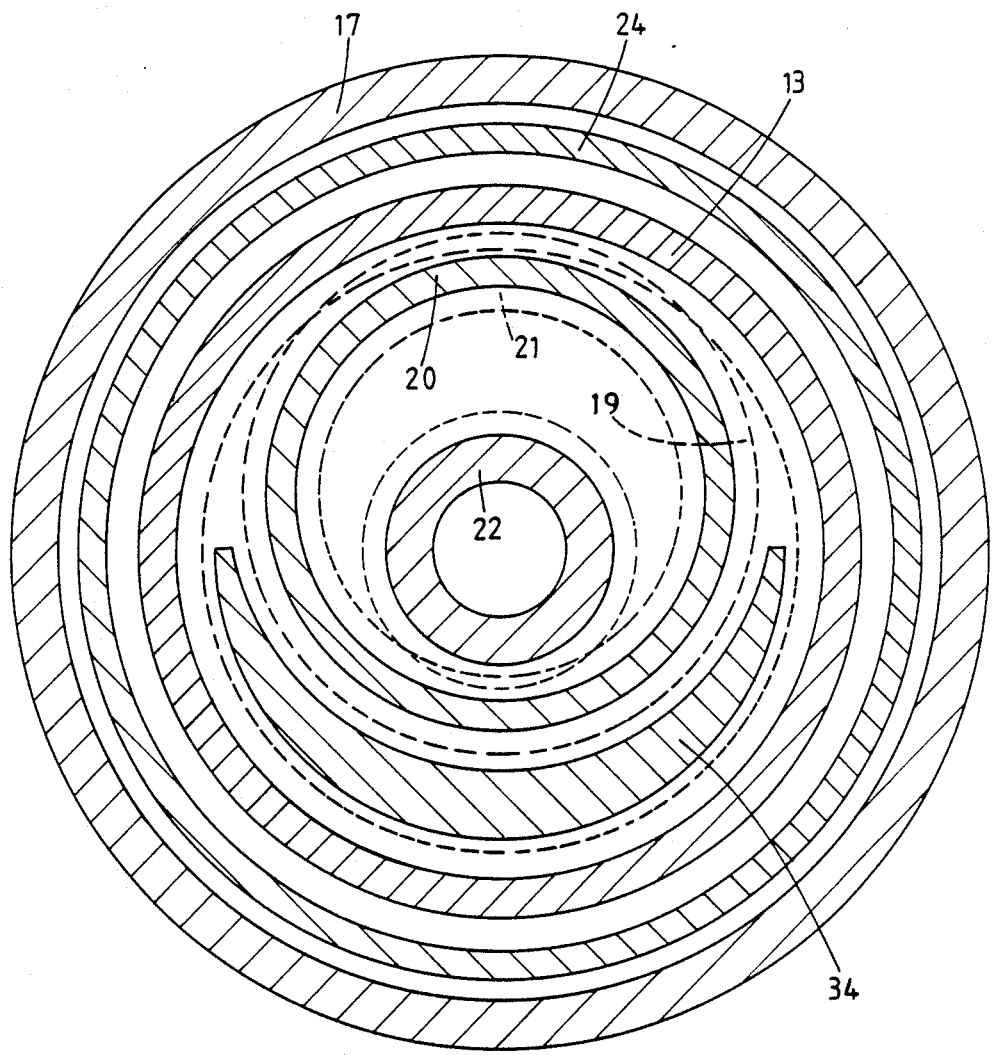
FIG. 3 is a section on line 3—3 in FIG. 2.

As shown in FIG. 1 an electric generator arrangement of the type generally known from U.S. Pat. No. 4,278,928 includes an alternator 10 driven by an input shaft 11 through a differential epicyclic gear arrangement 12. The arrangement 12 has one of its inputs 13 driven through fixed gears by the shaft 11 and the other of its input 14 driven by the shaft 11 through a variable stroke hydraulic pump and motor combination 15, 15. The stroke of the pump and motor combination 15,4 and hence the speed of the input 14 is dependent on the rotor speed of the alternator 10. The alternator 10 is required to be driven at a high speed, typically 24000 r.p.m. so that the use of plain bearings in the arrangement 12 is precluded unless a constant and adequate supply of lubricant can be provided. Typically lubricant in such a system is derived from part of a coolant supply to the alternator and may fluctuate. FIGS. 2 and 3 show a differential gear arrangement 12 which permits the use of rolling bearings throughout and in which centrifugal forces on the components may be reduced. The term rolling bearings used herein is to be understood as including either ball or roller bearings.

As shown in FIGS. 2 and 3 the first input element 13 is provided by a ring gear which is journalled in roller bearings 16 in part of a housing 17. The ring gear 13 has external teeth 18 through which drive is applied from the shaft 11. The ring gear 13 meshes with external teeth 19 on an annular plane gear 20 having internal teeth 21 which mesh with a sun gear 22 which provides an output drive to the alternator 10. The planet gear 20 is journalled eccentrically of the ring gear 13 and sun gear 22 by means of roller bearings 23 within a carrier 24 which is journalled by a roller bearing 25 within a further part of the housing 17 and by a roller bearing 26 within the ring gear 13. A further roller bearing 27 is located between the carrier 24 and ring gear 13. The sun gear 22 is journalled by roller bearings 28 within the carrier 24. The carrier 24 has external teeth 29 through which the second input 14 from the hydraulic pump and motor combination 15 (FIG. 1) is applied. The difference between the pitch circle diameters of the ring gear 13 and the external teeth 19 of the planet gear 20 is equal to the difference between the pitch circle diameters of the internal teeth 21 and the sun gear 22, and also equals the eccentricity of the axis of the planet gear 20 with respect to the axes of the ring gear 13 and sun gear 22.

It will be apparent that the carrier 24 is constructed in two parts, and has an opening 30 through which the ring gear 13 may engage the planet gear 20. This construction provides a crescent-shaped portion 34 between the ring gear 13 and the plane gear 20, as shown more clearly in FIG. 3. The sun gear 22 has an axial through bore into which is directed a nozzle 31 mounted in the carrier 24 and through which lubricant is, in use, introduced, this lubricant passing radially outwards through bore 32 in the nozzle 31 and bores 33 in the sun gear 22.

The construction shown enables bearings of large diameter to be used at all points of the arrangement. Considerations of space which preluded roller bearings and required the use of plain bearings no longer exist. Separating forces which normally exist between meshing gear teeth will tend to urge the annular planet gear 20 towards a more concentric position relative to the gears 13, 22. These forces oppose the centrifugal force which tends to urge the gear 20 towards greater eccentricity, and thus reduce out of balance forces within the arrangement.

I claim:

1. A differential gear arrangement comprising a housing, a ring gear, a sun gear a planet gear meshing with said ring gear and said sun gear, and a rotatable carrier for supporting said planet gear for movement of a central axis of the planet gear about central axes of said sun and ring gears, said planet gear being annular, journalled for rotation with respect to said carrier and having external teeth meshing with said ring gear and internal teeth meshing with said sun gear, and coupling means for making external drive connections to said sun gear, said ring gear and said carrier respectively, two of said coupling means providing input drive connections and a third of said coupling means providing an output drive connection.

2. A gear arrangement as claimed in claim 1 in which said sun gear is journalled in said carrier.

3. A gear arrangement as claimed in claim 1 in which all journal bearings comprise rolling bearing devices.

4. A epicyclic gear arrangement comprising a housing, a ring gear, a sun gear, a plane gear meshing with said ring gear and said sun gear, and a carrier for supporting said planet gear for movement about the axes of said sun and ring gears, said planet gear being annular, journalled for rotation relative to said carrier and having external teeth meshing with said ring gear and internal teeth meshing with said sun gear, said carrier being journalled by roller bearings both within and externally on said ring gear.

5. A gear arrangement as claimed in claim 4 in which said carrier and said ring gear are journalled in said housing.

6. A differential gear arrangement comprising a ring gear, a sun gear, a planet gear meshing with said ring gear and said sun gear, a rotatable carrier for supporting said planet gear for rotation of a central axis of the planet gear about central axes of said sun and ring gear, said planet gear being annular, journalled for rotation with respect to said carrier and having external teeth meshing with said ring gear and internal teeth meshing with said sun gear, and said carrier being journalled externally of said ring gear, and coupling means for making external drive connections to said sun gear, said ring gear and said carrier respectively, two of said coupling means providing an output drive connection.

* * * * *

UNITED STATES PATENT AND TRADEMARK OFFICE
CERTIFICATE OF CORRECTION

PATENT NO. : 4,825,726  
DATED : May 2, 1989  
INVENTOR(S) : Clifford R. Schofield Page 1 of 2

It is certified that error appears in the above-identified patent and that said Letters Patent is hereby corrected as shown below:

Column 1, line 56, before the period (.) delete ", 15";

line 57, after "combination 15," delete "4",

Column 2, line 8, after "annular" "plane" should read --planet-- line 32, after "and the" delete "plane" and substitute therefore --planet--;

line 41, after "which" delete "preluded" and substitute therefore --precluded--.

Claim 1, column 2, line 52, after "sun gear" insert --,--.

Claim 4, column 3, line 2, after "a sun gear, a" delete "plane" and substitute therefore --planet--.

Claim 6, column 4, line 5, after "ring" delete "gear" and substitute therefore --gears--.

UNITED STATES PATENT AND TRADEMARK OFFICE
CERTIFICATE OF CORRECTION

PATENT NO. : 4,825,726

DATED : May 2, 1989

INVENTOR(S) : Clifford R. Schofield

It is certified that error appears in the above-identified patent and that said Letters Patent is hereby corrected as shown below:

Claim 6, column 4, line 5, after "ring" delete "gear" and substitute therefore --gears--.

Signed and Sealed this

Twentieth Day of February, 1990

*Attest:*

JEFFREY M. SAMUELS

*Attesting Officer*    *Acting Commissioner of Patents and Trademarks*